No. 778,614. Patented December 27, 1904.

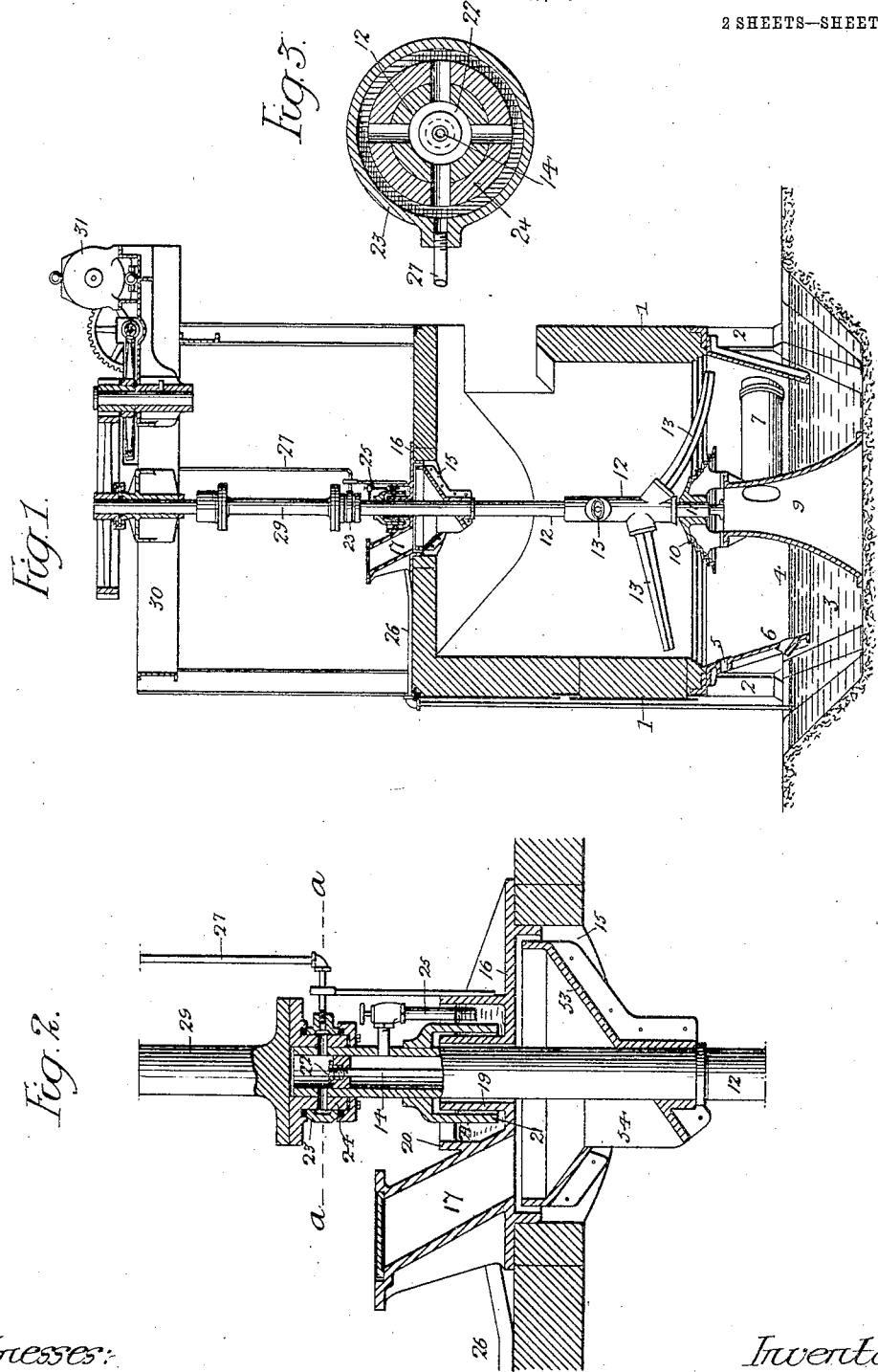

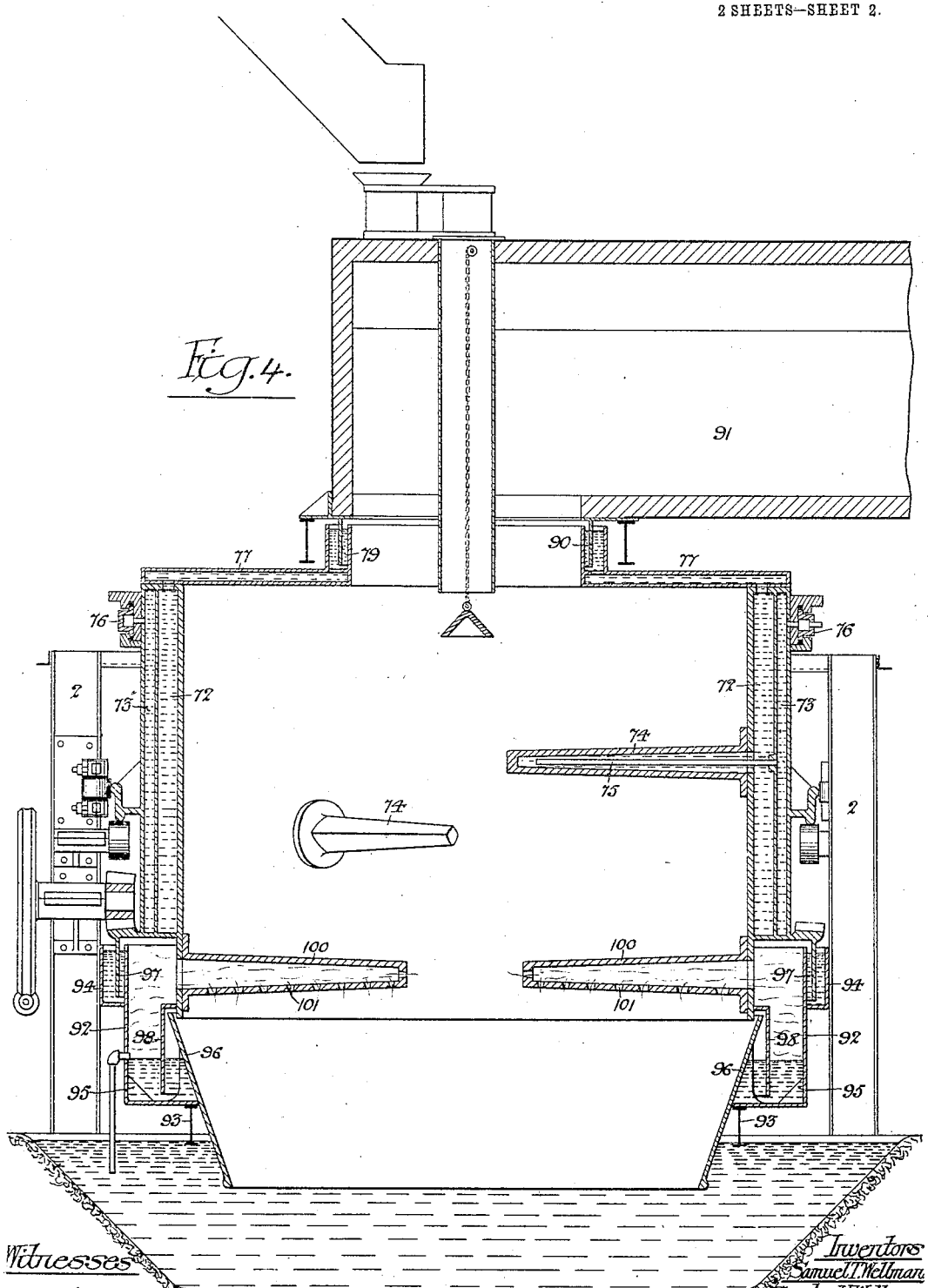

UNITED STATES PATENT OFFICE.

SAMUEL T. WELLMAN, CHARLES H. WELLMAN, AND JOHN W. SEAVER, OF CLEVELAND, OHIO, ASSIGNORS TO THE WELLMAN-SEAVER ENGINEERING COMPANY, OF CLEVELAND, OHIO, A CORPORATION OF OHIO.

GAS-PRODUCER.

SPECIFICATION forming part of Letters Patent No. 778,614, dated December 27, 1904.

Application filed February 19, 1902. Serial No. 94,750.

*To all whom it may concern:*

Be it known that we, SAMUEL T. WELLMAN, CHARLES H. WELLMAN, and JOHN W. SEAVER, citizens of the United States, and residents of Cleveland, Ohio, have invented certain Improvements in Gas-Producers, of which the following is a specification.

The object of our invention is to so construct a gas-producer as to provide for the effective breaking up of the clinkers in the fuel-bed and such agitation of the mass of fuel as to provide for the free flow of air through the same. This object we attain in the manner hereinafter set forth, reference being had to the accompanying drawings, in which—

Figure 1 is a longitudinal section of a gas-producer constructed in accordance with our invention. Fig. 2 is an enlarged section of part of the same, showing the construction of the upper end of the shaft or spindle which carries the fuel-stirring arms. Fig. 3 is an enlarged sectional plan view on the line $a$ $a$, Fig. 2; and Fig. 4 is a sectional view of another form of gas-producer embodying certain features of our invention.

In Fig. 1 of the drawings, 1 represents the casing of the producer, which is preferably of cylindrical form and is lined with fire-brick or other refractory material, this casing being mounted upon suitable legs or columns 2 above a sealing-pit 3, into which depends a flaring ash-hopper 4, secured to the under side of the producer-casing in the usual manner, this hopper having poke-holes 5 and 6 for the insertion of pokers, whereby the mass of ashes and clinkers contained in the hopper may be effectively opened up so as to be caused to descend into the sealing-pit, from which they can be readily removed, the depth of water in the sealing-pit extending so far above the bottom of the hopper as to prevent any escape of air through the ashes contained in the pit.

The air to support combustion is introduced through a lateral branch pipe 7 into a central hollow post or column 9, which rises from the bottom of the sealing-pit and has at the top an annular distributer 10, whereby the air is discharged laterally into the mass of ashes in the hopper 4 and in the lower portion of the producer. This distributer has a central stud 11, which constitutes a step upon which rests the lower end of a central hollow shaft or spindle 12, the latter having a series of projecting hollow arms 13—four in the present instance—which are in free communication with the interior of the hollow spindle and are supplied with water from a pipe 14, centrally disposed within the hollow spindle 12 and having branches extending into each of said hollow arms 13, so that water flowing through the pipe will be delivered into each of the arms and will then flow back through the arms into the hollow shaft.

The top of the producer is closed with the exception of a central opening 15, which has a cap-plate 16, from which projects upwardly an inclined fuel-feed spout 17 and central annular flanges 19 and 20, Fig. 2, the shaft 12 passing upwardly through the space within the inner flange 19 without being in contact with the latter and having a depending flange 21, which extends downwardly into the space between the flanges 19 and 20, this space being filled with water or other fluid, constituting a seal for the flange 21, thereby preventing the escape of any gas around the shaft 20 at the point where it emerges from the producer.

The upper portion of the hollow shaft 12 is divided by a plug 22 into upper and lower chambers, the upper chamber receiving water from a suitably-packed ring 23, said ring surrounding a flanged sleeve 24, with which the upper end of the hollow shaft 12 is provided, the chamber of said hollow shaft, which is below the plug 22, discharging through a pipe 25 into the sealing-trap formed between the flanges 19 and 20, which trap is provided with a suitable overflow-pipe 26, leading into the sealing-pit at the bottom of the producer.

The ring 23 receives a constant supply of cold water from a pipe 27, this water passing through openings in the upper end of the shaft 12 and in its sleeve 24 and entering the chamber above the plug 22, from which it passes downwardly through the pipe 14 into the arms 13 and thence flows backwardly into the hollow shaft 12 and rises therein to the overflow-pipe 25, whereby a constant flow of water through the hollow shaft and its arms is maintained and the burning out of said shaft or arms is prevented.

The flanged sleeve 24 of the tubular shaft 12 is connected to a suitable sectional shaft 29 above the producer, which shaft is adapted to a suitable bearing in the fixed superstructure 30 and is rotated by suitable gearing from an electric or other motor 31, mounted on said superstructure, as shown in Fig. 1. By this means the central shaft of the producer is supported without the necessity of providing it with a contact-bearing in the upper and highly-heated portion of the producer, the upper bearing of the shaft being remote from the heated top of the producer, and therefore not affected by such heat, while the lower step-bearing of the shaft is contained in the ashes at the bottom of the producer and is prevented from becoming overheated by the flow of water maintained at that point. Hence the free rotation of the shaft is not interfered with by any tendency of the same to bind or stick in its bearings.

As the fuel leaves the inclined feed-spout 17 it is caught in an inverted conical distributer 53 secured to the upper portion of the central shaft 12 of the producer and contained within the central opening 15 in the top of the producer, the lower portion of said distributer having at one side an opening 54, through which the fuel can escape. Hence as said distributer is constantly rotating the fuel will be discharged successively at different points around the axis of the shaft 12 and uniform distribution of the fuel in the fuel-chamber will thereby be insured.

The producer shown in Fig. 4 is one of the rotary type; but in this case we have discarded the central shaft, with its projecting arms, and have provided the rotating body of the producer with a double water-jacket comprising inner and outer chambers 72 and 73, the inner chamber 72 communicating with hollow arms 74, projecting inwardly from the casing, the number and location of these arms being dependent upon circumstances, such as the character of fuel employed and the desired conditions of working. Into each of the hollow arms 74 projects a pipe 75, which is in communication with the outer chamber 73, and a constant supply of cold water is conveyed to the latter through a properly-packed ring 76 or in any other available manner, this water passing through pipes 75 into the hollow arms 74 and flowing backwardly through the same into the chamber 72, from which it escapes into the water-chambered top 77 of the producer, said top having a central gas-discharge and fuel-feed opening, which is surrounded by a sealing-trough 79, in communication with the water-sealed top 77, this trough receiving a depending annular flange 90 on the gas-outlet flue 91.

Surrounding the lower portion of the producer-body is an annular casing 92, supported upon suitable transverse girders 93 above the sealing-pit, this casing receiving air under pressure from the usual blowers or other sources of supply through a pipe passing through any available portion of said casing 92, the chamber within this casing therefore constituting the air-chamber of the producer. This air-chamber is provided with upper and lower sealing-troughs 94 and 95, said upper trough being formed by an external flange at the top of the casing 92 and the lower trough being formed by the upper portion of the ash-hopper 96, the latter being secured to or forming part of said casing.

The rotating body of the producer has flanges 97 and 98 projecting, respectively, into the upper and lower sealing-troughs 94 and 95, and thereby effectually sealing the air-chamber formed within the casing 92.

Projecting inwardly from the lower portion of the producer-body are one or more hollow twyer-boxes 100, two of these boxes being shown in the present instance disposed on diametrically opposite sides of the producer. These twyer-boxes are in free communication with the air-chamber within the casing 92, and each of them has in the under side a series of openings 101, through which the air can escape. As the body of the producer is rotated, therefore, the inwardly-projecting water-cooled arms 74 in the upper portion of the same constantly break up the mass of incandescent fuel in the upper portion of the producer, while the twyer-boxes 100 agitate and break up the mass of ashes and clinkers in the lower portion of the producer, free discharge of the air into said mass of ashes from the twyer-boxes being thereby insured, as well as the free upward flow of said air through the mass of fuel in the upper portion of the producer.

Having thus described our invention, we claim and desire to secure by Letters Patent—

1. The combination in a gas-producer, of hollow stirring or agitating arms, a rotating element of the producer carrying the same and having a partition whereby it is divided into two chambers one of which communicates with said hollow arms, pipes projecting into the hollow arms and communicating with the other of said chambers, and means for supplying water to one of said chambers and conveying it from the other, substantially as specified.

2. The combination of the rotatable body of the gas-producer, having a double-chambered outer water-jacket, inwardly-projecting hollow agitator-arms carried by said body and communicating with one of the water-chambers of the jacket, and circulating-pipes projecting into said arms and communicating with the other water-chamber of the jacket, substantially as specified.

3. The combination of the rotatable body of the gas-producer having a water-jacket, inwardly-projecting hollow arms communicating with said jacket, and a water-jacketed top communicating with the water-jacket of the body, substantially as specified.

4. The combination of the rotatable body of the gas-producer, a sealed air-chamber surrounding the lower portion of said body, and inwardly-projecting twyer-boxes carried by said rotatable body of the producer and communicating with said air-chamber, substantially as specified.

5. The combination of the rotatable body of the gas-producer having upper and lower depending flanges and inwardly-projecting hollow twyer-boxes, with an annular casing surrounding the lower portion of said producer-body and having upper and lower sealing-troughs, and means for supplying air under pressure to the chamber between the upper and lower sealing-troughs of the casing, substantially as specified.

6. The combination of the rotatable body of the gas-producer having upper and lower depending flanges and inwardly-projecting hollow twyer-boxes, with an annular casing surrounding the lower portion of said producer-body and having upper and lower sealing-troughs, an ash-hopper secured to said casing, and means for supplying air under pressure to the chamber between the upper and lower sealing-troughs of the casing, substantially as specified.

In testimony whereof we have signed our names to this specification in the presence of two subscribing witnesses.

SAMUEL T. WELLMAN.
CHARLES H. WELLMAN.
JOHN W. SEAVER.

Witnesses:
C. W. COMSTOCK,
HERBERT P. GLIDDEN.